May 12, 1959     R. SERPE     2,885,761

FORM FOR PRECAST TERRAZZO SADDLE FOR DOORS

Filed Aug. 12, 1957     2 Sheets-Sheet 1

INVENTOR
RALPH SERPE

BY

ATTORNEY

May 12, 1959   R. SERPE   2,885,761
FORM FOR PRECAST TERRAZZO SADDLE FOR DOORS
Filed Aug. 12, 1957   2 Sheets-Sheet 2
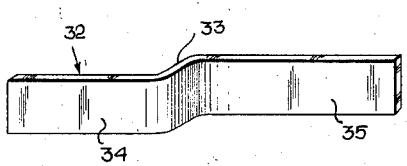
Fig-6-
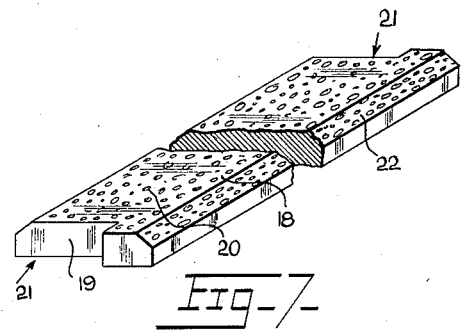
Fig-7-
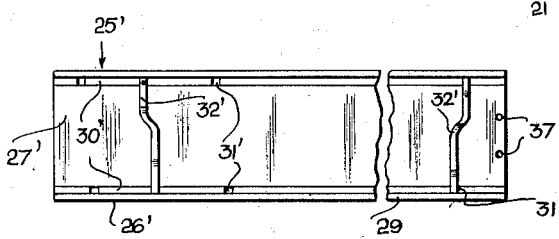
Fig-8-
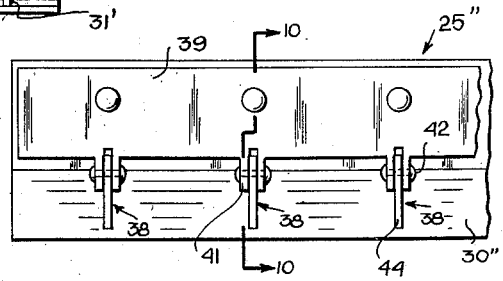
Fig-9-
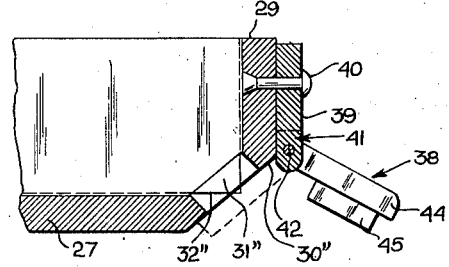
Fig-10-
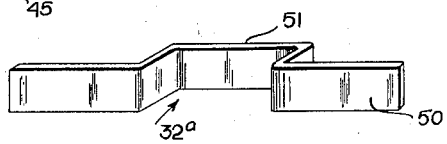
Fig-11-
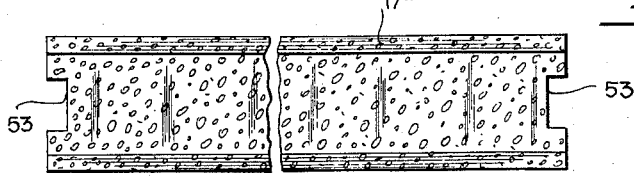
Fig-12-
INVENTOR
RALPH SERPE
BY
ATTORNEY

# United States Patent Office 2,885,761
Patented May 12, 1959

2,885,761

FORM FOR PRECAST TERRAZZO SADDLE FOR DOORS

Ralph Serpe, Brooklyn, N.Y.

Application August 12, 1957, Serial No. 677,687

1 Claim. (Cl. 25—118)

This invention relates to a mold for the formation of thresholds or saddles and, more particularly, to a mold for a threshold or saddle especially designed for a doorway of a home and the like.

An important object of the present invention is to provide a mold for a prefabricated threshold which can be manufactured and precision-fitted at the factory and delivered to the contractor ready for installation which will insure a properly shaped and reinforced threshold.

Another object of the invention is to provide by means of the mold a relatively inexpensive threshold but which will nevertheless possess the requisite strength and other needed properties.

Still another object is to provide by means of the mold a threshold which is easily set with relation to the floor.

Yet another object is to provide by means of the mold a threshold having no outside bolts or the like exposed above the floor so that the threshold is smooth and there are no unsightly bolts or the like for a passer-by to trip on.

It is also proposed to provide a mold for producing a threshold of cementitious material.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 6 is an enlarged perspective view of an end cross-piece of the form of Fig. 2.

Fig. 7 is a perspective view of the threshold produced by the mold of Fig. 2 and shown in Fig. 1.

Fig. 8 is a reduced top plan view of a modified form of mold for producing a threshold.

Fig. 9 is a fragmentary side elevational view of another modified form of mold for producing a threshold.

Fig. 10 is a cross-sectional view taken on the plane of the line 10—10 of Fig. 9 showing a pivoted plug in open position.

Fig. 11 is a perspective view of a modified form of end piece for use with the form of Fig. 2.

Fig. 12 is a top plan view of a threshold produced with end pieces of the type shown in Fig. 11.

Figure 1:
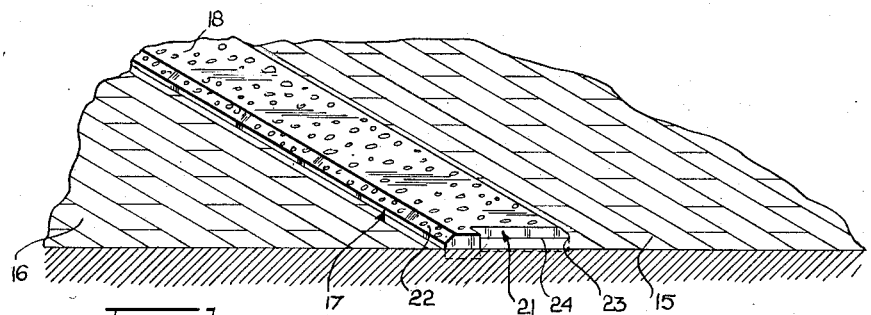
Fig. 1 is a fragmentary perspective view of a floor structure with a threshold or saddle made in accordance with the present invention installed in place.

Referring in detail to the drawings, in Fig. 1 the floor 15 of a room is shown alongside the floor 16 of an adjacent room with a threshold or saddle 17 made in accordance with the present invention spanning the space between the two floors. The threshold serves to seal the bottom of an openable door (not shown).

The threshold or saddle 17 comprises an elongated rectangular-shaped strip 18 of terrazzo material composed of cement 19 and chips 20 of colored marble embedded in the cement. Each end of the strip is cut away for the major portion of its width as indicated at 21 to provide a clearance to receive the adjacent door jamb (not shown). The long edges of the strip are tapered from their top ends as indicated at 22 to a point midway the height of the strip to eliminate sharp corners liable to be damaged in use. The floor structure may be countersunk as indicated at 23 and the strip 18 placed in cement 24 in said countersunk portion for securing the same to the floor structure.

Figure 2:
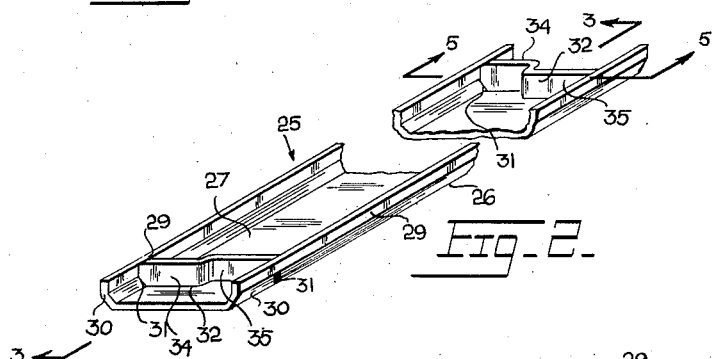
Fig. 2 is a perspective view of a mold for producing the threshold or saddle shown in Fig. 1, parts being broken away.
Figure 3:
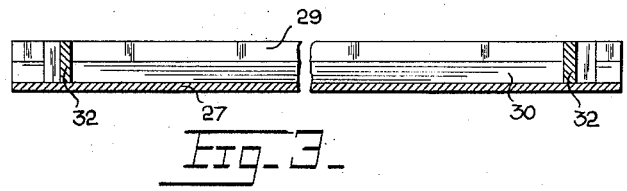
Fig. 3 is a longitudinal sectional view taken on the plane of the line 3—3 of Fig. 2.
Figure 4:
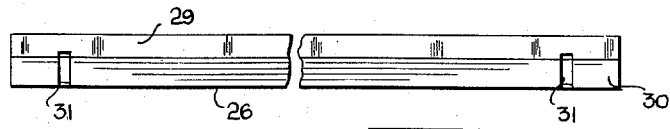
Fig. 4 is a side elevational view of the form of Fig. 2, parts being broken away.
Figure 5:
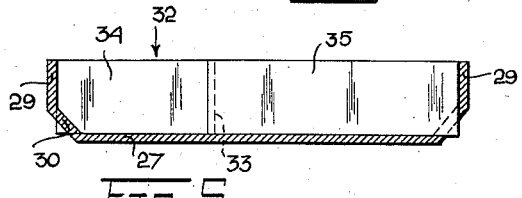
Fig. 5 is an enlarged cross-sectional view taken on the plane of the line 5—5 of Fig. 2.

The threshold or saddle 17 is made by means of the form 25 shown in Fig. 2. This form comprises an elongated rectangular-shaped shallow metal trough 26 having a floor portion 27 and side walls formed with straight upper portions 29, 29 and inwardly slanting lower portions 30, 30. At a point remote from the adjacent end of the trough, each lower slanting portion 30 is formed with a slot 31, the slots of each pair thus formed being in slightly offset relation.

A metal bar or strap 32 is positioned across the trough at each end thereof with its ends removably snapped into the adjacent slots 31, the bar being of a depth so that its top edge is flush with the top edge of the upper side wall portions 29, 29. Slightly spaced from its midsection, the bar is bent at right angles as indicated at 33 thereby providing offset outer and inner portions 34 and 35, respectively, when installed as viewed in Fig. 2. The inner portions 35 are slightly longer than the outer sections and are in opposed relation longitudinally.

In use, the terrazzo material composed of cement and chips of marble is poured in plastic state into the trough between the end bars 32, 32 until the material reaches the top of the side walls when it is leveled off. A vibrating machine is used to shake the form 25 and the material therein in order to eliminate air bubbles and to pack the cement and chips closely together. The poured material is then permitted to set and harden in the trough. When sufficiently hard, it is removed by removing the bars 32, 32 and sliding the formed material lengthwise out of the trough. When removed the material will be in strip form, the elongated inner sections 35, 35 of the bar having defined the cut away portions 21, 21 at the ends of the strip to provide clearances for the side jambs of the door frame. One surface of the formed strip, the bottom surface, when the material is in the trough and which constitutes the top surface of the strip in use, is rubbed and polished with a suitable tool until the colored chips of marble 20 are exposed, leaving the remainder of the strip with the appearance of plain cement.

It will thus be seen that we have provided a threshold easy to install, inexpensive and simple to construct, durable in nature and efficient in operation and service.

In the modified form of mold 25′ shown in Fig. 8, a plurality of pairs of offset spaced slots 31′ are formed along the lower slanting portions 30′ of the side walls of the trough 26′ at one end and a single pair of offset slots 31′ at the other end thereof. By reason of this construction, an end piece 32′ is inserted in the single pair of slots 31′ and the other end piece may be inserted in any pair of slots 31′ at the other end of the trough so that thresholds or saddles of various lengths may be molded. A pair of openings 37, 37 may be formed in one end of the floor portion 27′ to receive fastening elements for securing the mold to a supporting surface.

In all other respects, the form of invention shown in

Fig. 8 is similar to the form of Figs. 1–7 and similar reference numerals are used to indicate similar parts.

Referring to the modication shown in Figs. 9 and 10, the form of mold 25" shown herein differs from the form of Fig. 8 in that plug devices 38 are provided for the slots 31" in the lower side wall portions 30". The plug devices are supported on plates 39 secured to the outside of the upper side wall portions 29" by rivets 40. The plates 39 are formed with closely spaced depending lugs 41 on both sides of the slots 31". A pivot pin 42 is supported in aligned openings in the lugs of each pair of lugs and pivotally mounted on each pin is one end of a metal bar 44. A plug member 45 is carried on the bar at its other end in position to be swung into plugging relationship with the adjacent slot 31". When the plugs are in operative plugging position in the slots, the inner surfaces of the plug members are flush with the inner surfaces of the sides of the trough so that uninterrupted side wall surfaces are presented, thereby eliminating any marks on the molded threshold or saddle.

When a pair of substantially opposed slots 31" are to be used, the corners of the end piece 32" will be inserted into said slots and during this operation, the leading corners of the end piece will force the plug devices outwardly to the position shown in Fig. 10.

In Fig. 11, there is illustrated a modified form of end piece 32ª for use in each end of any of the forms of molds shown. This form of end piece comprises a flat plate 50 bent midway its ends into a rectangular-shaped channel portion 51. The end pieces 32ª are laid edgewise on the floor of the trough with the end corners snapped into the opposed slots of a pair of slots for interlocking the end pieces of the trough. When this type of end piece is used, a threshold or saddle 17ª such as shown in Fig. 12 is formed. This threshold has a central notch 53 in each end to provide clearance for and to accommodate the central jamb of a doorway frame.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

A mold for forming a threshold for the doorway of a home and the like comprising an elongated rectangular-shaped trough-shaped metal body with side wall portions having straight upper portions and inwardly slanting lower portions, the slanting lower portions having a plurality of pairs of slots at one end of the body and having a single pair of slots at the other end of the body, transversely disposed metal bars removably disposed in said single pair of slots and in a pair of slots at the other end of the body, plates secured to the outer surfaces of the straight upper portions of the side wall portions, pairs of closely spaced lugs depending from said plates, said lugs being disposed on opposite sides of the slots, bars pivotally mounted at one end on and between said lugs, and plugging members carried at the other end of said bars for plugging the slots, the inner surfaces of said plugging members when in operative plugging position being flush with the inner surfaces of the inwardly slanting lower portions of the side wall portions.

References Cited in the file of this patent
UNITED STATES PATENTS

| | | |
|---|---|---|
| 138,300 | Thomas | Apr. 29, 1873 |
| 171,870 | Saur | Jan. 4, 1876 |
| 1,326,251 | Cade | Dec. 30, 1919 |
| 1,705,201 | Nagel | Mar. 12, 1929 |
| 1,984,059 | Bandini | Dec. 11, 1934 |
| 2,018,192 | Sexton | Oct. 22, 1935 |
| 2,492,825 | Andrews et al. | Dec. 27, 1949 |
| 2,621,388 | O'Sullivan et al. | Dec. 16, 1952 |
| 2,721,368 | Landrum | Oct. 25, 1955 |
| 2,732,605 | Johnson | Jan. 31, 1956 |